United States Patent
Horesh et al.

(10) Patent No.: US 10,885,241 B2
(45) Date of Patent: Jan. 5, 2021

(54) MIS-SPECIFIED MODEL SUPPLEMENTATION

(71) Applicants: International Business Machines Corporation, Armonk, NY (US); Trustees of Tufts College, Medford, MA (US)

(72) Inventors: Lior Horesh, North Salem, NY (US); Ning Hao, Arlington, MA (US); Raya Horesh, North Salem, NY (US); David Nahamoo, Great Neck, NY (US); Misha E. Kilmer, Medfield, MA (US)

(73) Assignees: International Business Machines Corporation, Armonk, NY (US); Trustees of Tufts College, Medford, MA (US)

( * ) Notice: Subject to any disclaimer, the term of this patent is extended or adjusted under 35 U.S.C. 154(b) by 398 days.

(21) Appl. No.: 15/861,434

(22) Filed: Jan. 3, 2018

(65) Prior Publication Data

US 2019/0205488 A1 Jul. 4, 2019

(51) Int. Cl.
| | | |
|---|---|---|
| *G06F 30/20* | (2020.01) | |
| *G06N 7/00* | (2006.01) | |
| *G06F 111/10* | (2020.01) | |
| *G06F 7/02* | (2006.01) | |
| *G06F 30/3323* | (2020.01) | |

(52) U.S. Cl.
CPC ............. *G06F 30/20* (2020.01); *G06F 7/023* (2013.01); *G06F 30/3323* (2020.01); *G06F 2111/10* (2020.01); *G06N 7/005* (2013.01)

(58) Field of Classification Search
USPC .......................................... 703/2, 5, 6, 23, 26
See application file for complete search history.

(56) References Cited

U.S. PATENT DOCUMENTS

| | | | | |
|---|---|---|---|---|
| 5,197,114 A * | 3/1993 | Skeirik | ................ | G06N 3/0427 706/23 |
| 6,360,283 B1 * | 3/2002 | Houldsworth | .......... | G06F 17/10 710/3 |
| 2014/0178348 A1 * | 6/2014 | Kelsey | ................ | C12Q 1/6886 424/93.71 |

(Continued)

FOREIGN PATENT DOCUMENTS

CN 104049538 A 9/2014

*Primary Examiner* — Thai Q Phan
(74) *Attorney, Agent, or Firm* — Scully, Scott, Murphy & Presser, P.C.; Daniel P. Morris

(57) ABSTRACT

Methods and systems for generating output of a simulation model in a simulation system are described. In an example, a processor may retrieve observed output data from a memory. The observed output data may be generated based on a simulation operator of a simulation model. The processor may further optimize a generalization error of a distance measure between the observed output data and model output data. The model output data may be generated based on a high-fidelity operator. The processor may further determine a correction operator based on the optimized generalization error of the distance measure. The processor may further append the correction operator to the simulation operator to produce a supplemented operator. The processor may further generate supplemented output data by applying the simulation model with the supplemented operator on a set of inputs.

20 Claims, 6 Drawing Sheets

(56) References Cited

U.S. PATENT DOCUMENTS

2017/0145813 A1* 5/2017 Horesh ................... E21B 47/10
2018/0349788 A1* 12/2018 Sarkar ..................... G06F 7/023
2018/0349798 A1* 12/2018 Avron ..................... G06N 7/005

* cited by examiner

MIS-SPECIFIED MODEL SUPPLEMENTATION

FIELD

The present application relates generally to computers, and computer applications, and more particularly to computer-implemented methods and systems for supplementation of numerical simulation models.

BACKGROUND

Numerical simulators may be used in industry and in academia to imitate physical processes or complex systems in well-controlled and repeatable settings. Numerical simulation (i.e. defining the state of a system given input parameters and governing relations) is instrumental for description, prediction, control and design of complex systems. Fidelity of the simulation process plays a critical role in attainment of meaningful predictive capabilities. Frequently, the simulation model is mis-specified to a certain extent.

SUMMARY

In some examples, methods for generating output of a simulation model in a simulation system are described. The methods may include retrieving, by a processor, observed output data from a memory. The observed output data may be generated based on a simulation operator of a simulation model. The methods may further include optimizing, by the processor, a generalization error of a distance measure between the observed output data and model output data. The model output data may be generated based on a high-fidelity operator. The methods may further include determining, by the processor, a correction operator based on the optimized generalization error of the distance measure. The methods may further include appending, by the processor, the correction operator to the simulation operator to produce a supplemented operator. The processor may further generate supplemented output data by applying the simulation model with the supplemented operator on a set of inputs.

In some examples, systems effective to generate output of a simulation model in a simulation system are described. An example system may include a memory that may be configured to store a simulation model. The simulation model may include a simulation operator. The system may further include a simulation module configured to be in communication with the memory. The simulation module may be configured to generate observed output data based on the simulation operator. The simulation module may be further configured to store the observed output data in the memory. The simulation module may be further configured to generate model output data based on a high-fidelity operator. The simulation module may be further configured to store the model output data in the memory. The system may further include a supplementation module configured to be in communication with the memory. The supplementation module may be configured to retrieve the observed output data from the memory. The supplementation module may be further configured to optimize a generalization error of a distance measure between the observed output data and model output data. The supplementation module may be further configured to determine a correction operator based on the optimized generalization error of the distance measure. The system may further include a processor configured to be in communication with the simulation module and the supplementation module. The processor may be configured to append the correction operator to the simulation operator to produce a supplemented operator. The simulation module may be further configured to generate supplemented output data by applying the simulation model with the supplemented operator on a set of inputs.

In some examples, computer program products for supplementing simulation operators in a machine learning system are described. An example computer program product may comprise a computer readable storage medium having program instructions embodied therewith. The program instructions may be executable by a device to cause the device to retrieve observed output data from a memory. The observed output data is generated based on a high-fidelity simulation operator or experimentation process. The program instructions may be further executable by a device to cause the device to optimize a generalization error of a distance measure between the observed output data and model output data. The model output data may be generated based on a simulation operator of a simulation model. The program instructions may be further executable by a device to cause the device to determine a correction operator based on the optimized generalization error of the distance measure. The program instructions may be further executable by a device to cause the device to append the correction operator to the simulation operator to produce a supplemented operator. The program instructions may be further executable by a device to cause the device to generate supplemented output data by applying the simulation model with the supplemented operator on a set of inputs.

DETAILED DESCRIPTION

Briefly stated, methods and systems for generating output of a simulation model in a simulation system are described. In an example, a processor may retrieve observed output data from a memory. The observed output data may be generated based on a high-fidelity simulation operator or experimentation process. The processor may further optimize a generalization error of a distance measure between the observed output data and model output data. The model output data may be generated based on a high-fidelity operator. The processor may further determine a correction operator based on the optimized generalization error of the distance measure. The processor may further append the correction operator to the simulation operator to produce a supplemented operator. The processor may further generate supplemented output data by applying the simulation model with the supplemented operator on a set of inputs.

Figure 1:
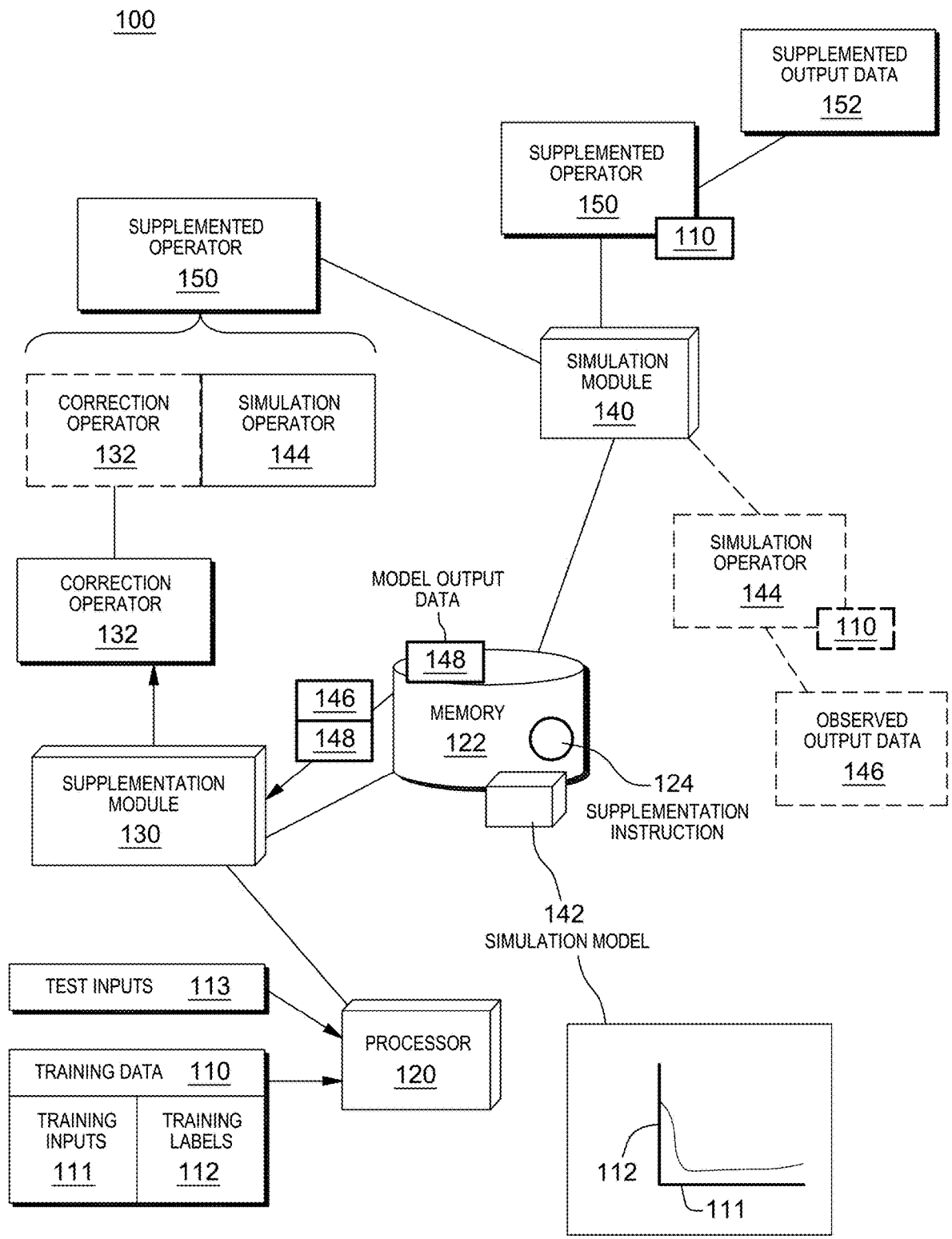
FIG. 1 illustrates an example computer system that can be utilized to implement mis-specified model supplementation.

FIG. 1 illustrates an example computer system 100 that can be utilized to implement mis-specified model supplementation, arranged in accordance with at least some embodiments described herein. In some examples, system 100 may be implemented as a simulation system effective to run simulations to imitate physical processes or complex systems. For example, system 100 may receive a set of training data and may learn a function, or model, based on the training data, where the training data may include training inputs and training outputs. In some examples, system 100 may apply regression techniques on the training inputs and training outputs to learn a model. In some examples the models learned by system 100 may be predictive models that may be used as a predictive function to predict an output based on an input. In some examples, the models learned by system 100 may be simulation models that may be used to run simulations to imitate physical processes such as a manufacturing process of a product.

System 100 may be a computer system, and may include a processor 120, a memory 122, a supplementation module 130, and/or a simulation module 140. Processor 120, memory 122, supplementation module 130, and simulation module 140 may be configured to be in communication with each other. In some examples, processor 120, memory 122, supplementation module 130, and simulation module 140 may be housed, or distributed, in a same housing and/or a computer device. In some examples, processor 120, memory 122, supplementation module 130, and simulation module 140 may be housed, or distributed, in two or more different housings and/or computer devices. For example, processor 120 and memory 122 may be distributed in a first device and supplementation module 130 and simulation module 140 may be distributed in a second device different from the first device.

In another embodiment, processor 120, memory 122, supplementation module 130, and simulation module 140 may each be hardware components or hardware modules of system 100. In some examples, supplementation module 130 and simulation module 140 may each be a hardware component, or hardware modules, of processor 120. In some examples, processor 120 may be a central processing unit of a computer device. In some examples, processor 120 may control operations of supplementation module 130 and simulation module 140. In some examples, supplementation module 130 and simulation module 140 may each include electronic components, such as integrated circuits. In some examples, supplementation module 130 and simulation module 140 may each be processors configured to perform respective operations. In some examples, supplementation module 130 and simulation module 140 may each be an embedded system, such as programmable devices such as field-programmable-gate-array (FPGA), or other types of application specific integrated circuits (ASIC), etc. In some examples, supplementation module 130 and simulation module 140 may each be software modules that may be implemented with processor 120.

Memory 122 may be configured to store a supplementation instruction 124. Supplementation instruction 124 may include one or more set of instructions to facilitate implementation of system 100. In some examples, supplementation instruction 124 may include instructions to apply regression techniques, and various computation techniques such as gradient determination, matrix operations, etc. on data received at system 100. In some examples, supplementation instruction 124 may indicate one or more objective functions, conditions, and/or constraints associated with an implementation of system 100 (described below). Processor 120, supplementation module 130, and simulation module 140 may each retrieve supplementation instruction 124 from memory 122, and may each execute one or more portions of supplementation instruction 124 to facilitate implementation of system 100.

Processor 120 may be configured to receive training data 110, where training data 110 may include training inputs 111 and training labels 112. Processor 120 may learn a simulation model 142 based on training data 110. Simulation module 140 may receive inputs and may apply simulation model 142 to the received inputs, such as by fitting the received inputs in a function representing simulation model 142, in order to predict an output. In an example, simulation module 140 may receive a set of test inputs 113 and may generate a set of observed output data 146 based on simulation model 142. Simulation model 142 may be represented by a function, and may include one or more operators to facilitate generation of output data from simulation model 142. For example, simulation model 142 may include a simulation operator 144. Observed output data 146 may be output generated by simulation model 142 with use of simulation operator 144.

In an example, observed output data 146 may be associated with a fidelity, or correctness, of a model. For example, in a recommendation system, training data 110 may be associated with a shopping history of a user, and observed output data 146 may be associated with recommendations to purchase one or more items based on a prediction generated by simulation model 142 using simulation operator 144. When an output of simulation model 142 is relatively incorrect, the output may be deemed as relatively low in fidelity and thus, simulation model 142 may be deemed as mis-specified. System 100 may execute supplementation instruction 124 to optimize the fidelity of output generated by simulation model 142. In another example, system 100 may be a simulation system for a complex process such as lens manufacturing. Training data 110 may be associated with properties of lenses produced based on application of various settings and/or controls on a slab of gel. Observed output data 146 may include simulated properties of lenses that may be produced using simulation model 142 and based on simulation operator 144.

In order to improve a fidelity of outputs generated by simulation model 142, system 100 may execute supplementation instruction 124 to generate a correction operator 132. Generation of correction operator 132 may be based on minimization of errors and/or differences between observed outputs (e.g., observed output data 146) and model outputs (e.g., model output data 148) that may be generated by a fully specified, or high-fidelity, operator (further described below). System 100 may append correction operator 132 to a simulation operator 144 of simulation model 142. By appending correction operator 132 to simulation operator 144, a supplemented operator 150 may be generated, and simulation model 142 may use supplemented operator 150 to generate outputs instead of using simulation operator 144. Further, by appending correction operator 132 to simulation operator 144, a need to modify simulation model 142, which may be stored in memory 122, may be avoided. In an example, system 100 may deploy simulation module 140 in a simulation platform, such that simulation module 140 may generate outputs based on simulation model 142 with supplemented operator 150. Simulation module 140 may generate supplemented output data 152 using simulation model 142 and based on supplemented operator 150, where supplemented output data 152 may be associated with a fidelity greater than a fidelity of observed output data 146.

In some examples, generation of correction operator 132 may begin by processor 120 accessing simulation model 142 from memory 122. For example, processor 120 may retrieve a copy of data associated with simulation model 142. In some examples, processor 120 may generate correction operator 132 based on evaluations on training data 110 and simulation model 142, while being consistent with desired correction structural requirements as well as complying with desired model (e.g., corrected model vs. the correction itself) virtues. Processor 120 may identify one or more simulation operators among simulation model 142. In the example shown in FIG. 1, processor 120 may identify simulation operator 144 from simulation model 142. In some examples, processor 120 may identify simulation operator 144 from simulation model 142 based on conditions indicated in supplementation instruction 124. For example, supplementation instruction 124 may indicate a number of observed outputs generated by simulation model 142 and if the number of observed outputs exceeds a particular threshold, processor 120 may identify one or more simulation operators among simulation model 142 to generate correction operators for the one or more simulation operators.

In response to identifying simulation operator 144, processor 120 may send a signal to supplementation module 130 to instruct supplementation module 130 to generate correction operator 132. Supplementation module 130 may access, or retrieve, data associated with simulation operator 144 from memory 122. In some examples, training data 110, observed output data 146, and model output data 148 may be stored in memory 122. Supplementation module 130 may retrieve observed output data 146 from memory 122. Supplementation module 130 may execute supplementation instruction 124 to generate correction operator 132. In an example, supplementation module 130 may execute supplementation instruction 124 to assign simulation operator 144, observed output data 146, and model output data 148 to variables of an objective function (further described below). Supplementation module 130 may further execute supplementation instruction 124 to formulate an optimization problem, and may formulate an objective function. Formulation of the objective function may include utilizing constraints indicated by supplementation instruction 124 to predict a structure of correction operator 132. By predicting a structure of correction operator 132, a representation of correction operator 132 may be included in the objective function, such that solutions to the objective function may be determined as elements of correction operator 132. Supplementation module 130 may, for example, minimize a generalization error of a difference, or discrepancy, between observed output data 146 and model output data 148, where model output data 148 may be generated based on a high-fidelity operator. A corrected operator may be a combination of mis-specified simulation operator 144 and an optimal supplement operator (further described below).

For a set of simulation model input parameters, a corresponding set of output data, of high-fidelity, may be attainable. The set of output data may be obtained in various ways, such as through experimentation with known input models, analytic derivation, or alternatively through the use of a computationally intensive high-fidelity simulation. Given such information, a model supplementation/correction problem may be formulated as a stochastic constrained optimization problem. The objective function to be optimized may involve a measure of the discrepancy between the expected output of the current (low-fidelity) model along with unknown supplementation against the data. In some examples, a structure of the supplementation operator may be known, but the supplementation operator itself may be unknown. Recovery of the supplementation operator by fitting data into an optimization problem may be under unbounded conditions such that a number of potential supplements may be determined by fitting the data. As such, the structure of the supplementation operator may be incorporated through additional constraints (such as bounding a rank of the supplementation operator), or as a penalty on the objective function formulated from the optimization problem. The resulting optimization problem of recovering the supplementation operator given the data and these additional constraints may be formulated as the supplemental design optimization problem. One such preference for an additive linear simulation model would be that the rank of the supplement is small. Such an assumption can be justified in a broad range of applications in the field of ill-posed inverse problems, since the effective rank of the most comprehensive simulation models is smaller than the number of observations. A close computationally tractable alternative can be obtained by employing instead of a hard rank constraint, the tightest convex relaxation to the rank, which is the nuclear norm. In other words, a problem that may be solved is to find the supplementing/correcting operator that satisfies a nuclear norm constraint. Following the solution of the operator supplemental design optimization problem, a supplementing/correcting modeling operator may be obtained. The derived supplementation operator may be used in practice to improve a fidelity of a simulation procedure or simulation model. In addition, a-priori known or postulated attributes of the corrected model, comprising both the correction term and the mis-specified model, can be incorporated as additional set of constraints or penalties upon the corrected model. Examples of such attributes may be symmetry, conservation requirement, or measures of simplicity.

In an example, prediction model 142 may include one or more incomplete observation operators that may describe approximated physics (governing equations, geometry, boundary conditions, input model parameters, etc.), approximated numerics, discretization errors, linearization of a non-linear process, or other unknown sources of error. In some examples, a practical application may be to improve reduced physics formulation with respect to a more comprehensive formulation. In such a situation, there may only be limited (blackbox) access to computationally intensive simulator (e.g., simulation module 140) in the form of input models and respective simulated data, where the objective would be to optimally (for a given generative model) supplement a reduced physics model with the necessary components. Another application may be when an ability to derive an observation operator is limited, and yet, experimentation with various test models (phantoms) while recording corresponding data is possible.

In an example, let A (where $A \in \mathbb{R}^{m \times n}$) denote an incomplete observation operator among simulation model 142. A simulation operator, denoted as d (where $d \in \mathbb{R}^m$, may be approximated through the following relation:

$$d = A(x) + \in + \eta(x)$$

where $\in$ denotes measurement noise and $\eta$ denotes modeling error, or model mis-specification.

A complete observation operator, which may be an ideal operator that may be used by simulation model 142 to generate an ideal output, may be denoted as:

$$F(x) = A(x) + \eta(x)$$

which may transform a model $x \in \mathbb{R}^m$ into an observable space F: $\mathbb{R}^n \to \mathbb{R}^m$. Supplementation module 130 may use the above defined variables and/or operations to formulate a design problem denoted as:

$$\hat{\eta} = \operatorname*{argmin}_{\eta} U(\eta(\hat{x}))$$

s.t. (such that)$\hat{x} = \operatorname*{argmin}_{x} D(A(x) + \eta(x), d) + R(x)$ where U denotes a utility measure that imposes a predefined functional form upon a desired correction (e.g., correction operator 132). D denotes a distance measure function (noise model), R denotes a regularization operator, and η the desired correction operator (since minimizing the model mis-specification is the desired objective, the desired correction operator may be denoted substantially the same as the model mis-specification in the above design problem). In some examples, the distance measure function D may be a function to determine a Frobenius norm of an operator. The above design problem is a complex bi-level optimization problem that may require special consideration.

In situations where inference is not necessary and simulation itself is the mere objective, the formulation of the above design problem may be replaced by a relatively simpler (mono-level) formulation, such as:

$$\hat{\eta} = \operatorname*{argmin}_{\eta} U(\eta(\hat{x}))$$

s.t. $D(A(x) + \eta(x), d) \leq \epsilon$

Some instances of the functional form can be either explicit structure (e.g. describing specific missing entries that need to be learned in an observation operator) or implicit (e.g. low rank, sparsity, coherency). Further described below, there may be an instance of the design problem where specific choice of functional form may be provided, yet the proposed methodology is applicable for any functional form.

In an example, an observation operator correction of low rank functional form (or convex relaxation of which measured by a nuclear norm) may be considered. In other words, the design problem may include a condition to bound a matrix rank of correction operator 132. Such a design problem may be formulated as:

$$\hat{B} = \operatorname*{argmin}_{B} \|B(\hat{x})\|_*$$

s.t. $\hat{x} = \operatorname*{argmin}_{x} D(A(x) + B(x), d) + R(x)$ where B denotes desired correction operator 132, and $\hat{B}$ denotes an optimal choice for B, $\|\cdot\|_*$ denotes a nuclear norm operation being performed on an operator (e.g., B), which may be defined as the sum of the singular values of the operator. If B is assumed to be linear with respect to a variable x, a measurement noise level (in some measure or metric) may be bounded as:

$$\hat{B} = \operatorname*{argmin}_{B} \|B(x)\|_*$$

s.t. $D(A(x) + Bx, d) \leq \tau$ where τ may denote an upper bound to the error of the prediction. In some examples, τ may be prescribed by a user of system 100, per the desired level of fidelity required for correction operator 132. In examples where a value of τ is relatively large, the original operator A without any correction from B would comply with the constraint. In examples where a value of τ is relatively small, operator A may rely on B to obtain appropriate predictions. An associated cost of tightening that bound is that the complexity of B may increase. Alternatively, an effective rank of the correction operator B may be bounded as:

$$\hat{B} = \operatorname*{argmin}_{B} D(A(x) + Bx, d)$$

s.t. $\|B\|_* \leq \frac{\delta}{2}$

In other words, the design problem may be formulated with objectives of minimizing the distance measure function $D(A(x)+Bx, d)$ such that a matrix rank of B is bounded to be less than or equal to an arbitrary, such as δ/2. The distance measure function D may be associated with a difference between data realizations $d_{ij}$ and model realization for the input $x_i$, which may be results of using a high-fidelity operator. For a linear operator A, a combination of the operators A+B may be a high-fidelity operator, where B may be an ideal supplement operator. By minimizing an error of the distance measure between data realizations $d_{ij}$ and model realization for the input $x_i$ resulting from the high-fidelity operator, the solution to the objective function may include a correction operator $\hat{B}$. A combination of operators A+$\hat{B}$ may be a supplemented operator. A fidelity associated with outputs of the supplemented operator may be greater than a fidelity of outputs of the simulation operator A, and may be lower than a fidelity of outputs of the high-fidelity operators A+B. The relative lower fidelity when compared to the high-fidelity operator may be a result of the bound on the rank of B. Yet, by bounding a rank of B, the simulation model may be generalized and over-training of the simulation model may be avoided.

The above design problems may be solved in a stochastic optimization framework. For example, one may assume that a model belongs to a model space $x \in M$ with an associated distribution π(x) from which one may draw samples $\mu_1, \mu_2, \ldots, \mu_{n_x}$. For each model realization $x_i$ one may assume the availability of data realizations $d_{ij}$ where the subscript j corresponds to measurement (uncorrelated) random noise samples. A goal would be to infer the supplementary operator over the provided model set (e.g., correction operator 132), by minimization of a generalization error term (empirical estimate of the Bayesian risk), such as:

$$\hat{B} = \operatorname*{argmin}_{B} E_{x,\epsilon} D(A(x) + Bx, d)$$

s.t. $\|B\|_* \leq \frac{\delta}{2}$

In other words, in order to generate correction operator 132, one may derive correction operator 132 from the above objective function, which indicates an objective to minimize a generalization error of the distance measure function D(A(x)+Bx, d) with the condition that a matrix rank of B is bounded to be less than or equal to δ/2. The expectation $E_{x,\epsilon}$ may denote an expectation with respect to a model variability and measurement noise E realizations.

By using the above mentioned examples of formulations, supplementation module 130 may derive correction operator 132 (B) by determining solutions to the objective functions resulting from the design problems.

Figure 2:
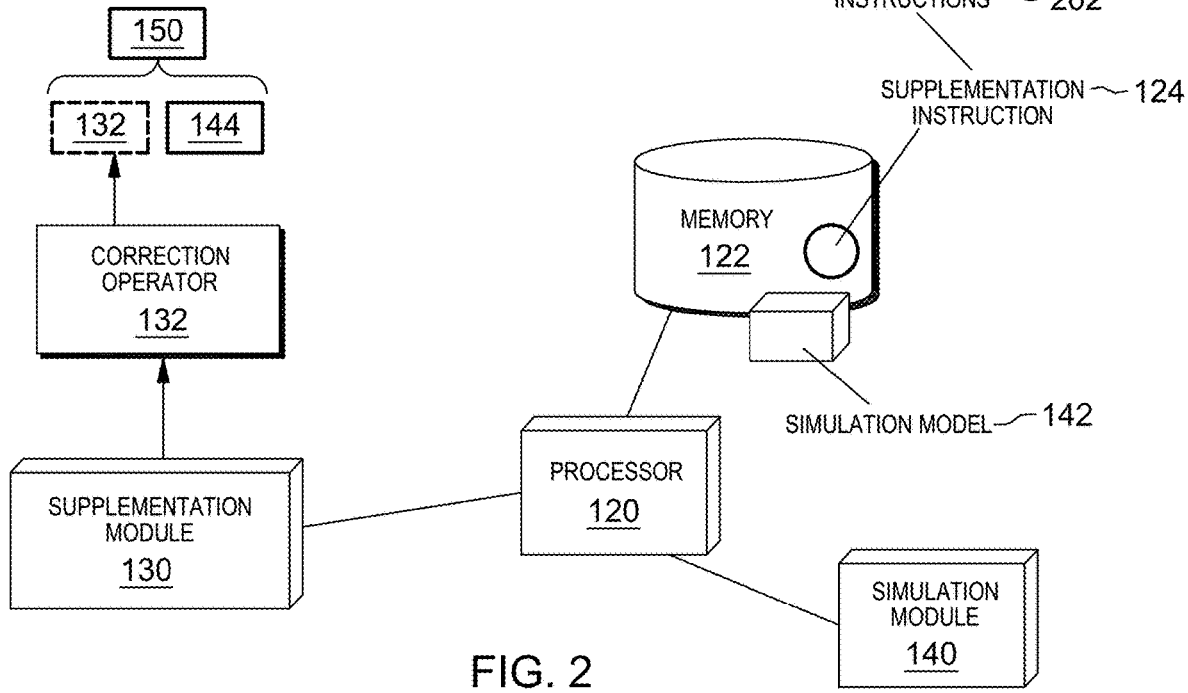
FIG. 2 illustrates an example set of instructions that may be executed during an implementation of mis-specified model supplementation.

FIG. 2 illustrates an example set of instructions that may be executed during an implementation of mis-specified model supplementation, arranged in accordance with at least some embodiments described herein. FIG. 2 is substantially similar to computer system 100 of FIG. 1, with additional details. Those components in FIG. 2 that are labeled identically to components of FIG. 1 will not be described again for the purposes of clarity.

In some examples, stochastic optimization formulations can be considered. In an example shown in FIG. 2, instructions 202 may be a part of supplementation instruction 124, and may be a set of instructions that may be executed by processor 120 and/or supplementation module 130 to generate correction operator 132. Instruction 202 may be based on a sample average approximation approach, such that an expectation with respect to a model space as well as the measurement noise may be approximated by sampling techniques, such as:

$$\hat{B} = \underset{B}{\operatorname{argmin}} \frac{1}{n_x n_\epsilon} \sum_{i=1,j=1}^{n_x,n_\epsilon} D(A(x_i) + Bx_i - d_{i,j})$$

$$\text{s.t. } \|B\|_* \leq \frac{\delta}{2}$$

In examples where an objective is a quadratic formulation, the design problem may be reformulated in matrix form, such as:

$$\hat{B} = \underset{B}{\operatorname{argmin}} E_{x,\epsilon} \|(A+B)X - D\|_F^2$$

$$\text{s.t. } \|B\|_* \leq \frac{\delta}{2}$$

where $X \in \mathbb{R}^{n \times n_x n_\epsilon}$ and $D \in \mathbb{R}^{m \times n_x n_\epsilon}$, and $\|\cdot\|_F$ denotes a Frobenius norm operating being performed on an operator.

Another example approach may be stochastic approximation, in which a candidate search direction is determined approximately at each iteration based on information from a single realization. The actual search direction is weighted in consolidation with previous steps. Solution of this problem may be made efficiently by considering a convex optimization formulation that requires an inexact estimate of the algebraically largest eigenvector and eigenvalue.

For example, since for any nonzero matrix $B \in \mathbb{R}^{m \times n}$ and $\delta \in \mathbb{R}$, a rank of B is bounded to be less than or equal to δ/2 if and only if there exists symmetric matrices $M \in \mathbb{R}^{m \times m}$ and $N \in \mathbb{R}^{n \times n}$ such that:

$$\begin{pmatrix} M & B \\ B^T & N \end{pmatrix} \geq 0 \text{ and trace} \begin{pmatrix} M & B \\ B^T & N \end{pmatrix} = \delta.$$

Assuming a matrix Z is denoted as:

$$Z = \begin{pmatrix} M & B \\ B^T & N \end{pmatrix}$$

Then, a design problem may be formulated as:

$$\min_Z \hat{f}(Z)$$

$$\text{s.t. } Z \in \mathbb{S}^{(m+n) \times (m+n)}$$

$$Z \geq 0$$

$$\text{trace }(Z) = \delta$$

where $S \in \mathbb{R}^{m+n}$ a family of symmetric matrices and the function $\hat{f}$ applies the function $f$ upon the upper right m×n sub-matrix of Z (or B).

Focusing on instructions 202, at line 1, an input to supplementation module 130 may be a scaled convex function $f$. Scaled convex function $f$ may be a function indicating a function to be minimized.

At line 2 of instructions 202, one or more variables and/or matrices may be initialized. A matrix Z may be an outer product between a variable $v_0$ and a transpose of $v_0$ (denoted as $v_0^T$, where superscript T denotes a transpose). Matrix Z may be of an arbitrary structure (e.g., size, number of rows, columns), and may be of a different structure from matrices associated with other operators and/or matrices (e.g., A, B, X, D). Since elements of correction operator 132 (B) may be determined iteratively, by initializing matrix Z, elements of correction operator 132 derived from instructions 202 may be populated into corresponding element positions of Z substantially intermediately to improve an efficiency of system 100. In some examples, initialization of matrix Z may include allocating ranges of memory addresses in memory 122 such that elements of correction operator 132 may be stored in the allocated memory addresses upon derivation.

At line 3 of instructions 202, a condition is set for supplementation module 130 to execute lines 4 to 9, iteratively, for a variable k from 1 up to $4C_f/\epsilon$, where $C_f$ denotes an upper bound to the number of iterations. In some examples, $C_f$ may be adjustable, such as by a user of system 100, and may be determined empirically.

At line 4 of instructions 202, supplementation module 130 may populate matrix Z with appropriate elements of B to generate correction operator 132. For example, correction operator 132 at iteration k ($B_k$) may be a sub-matrix of the bigger operator $Z_k$, and supplementation module 130 may assign entries of rows 1 to m, and columns m+1 to m+n, of $Z_k$ to correction operator 132 at iteration k ($B_k$).

At line 5, supplementation module 130 may determine a gradient of $f$ for each k, where the gradient of $f$ may be denoted as:

$$\nabla f_k = X((A+B)X - D)^T$$

At line 6, supplementation module 130 may assemble a gradient of $\hat{f}$ denoted as:

$$\nabla \hat{f} = \begin{pmatrix} 0 & \nabla f_k \\ \nabla f_k^T & 0 \end{pmatrix}$$

At line 7, supplementation module 130 may determine the largest eigenvector for each value of k, denoted as:

$$v_k = \max_{v_k} eig\left(-\nabla \hat{f}_k, \frac{C_f}{k^2}\right)$$

At line 8, supplementation module 130 may perform a line search to determine a step length $a_k$.

At line 9, supplementation module 130 may update a next row of Z (e.g., $Z_{k+1}$) using the following formulation:

$$Z_{k+1} = Z_k + a_k(v_k v_k^T - Z_k)$$

At line 11, supplementation module 130 may complete determination of B for each value of k, and may return a result, which may be correction operator 132.

Figure 3:
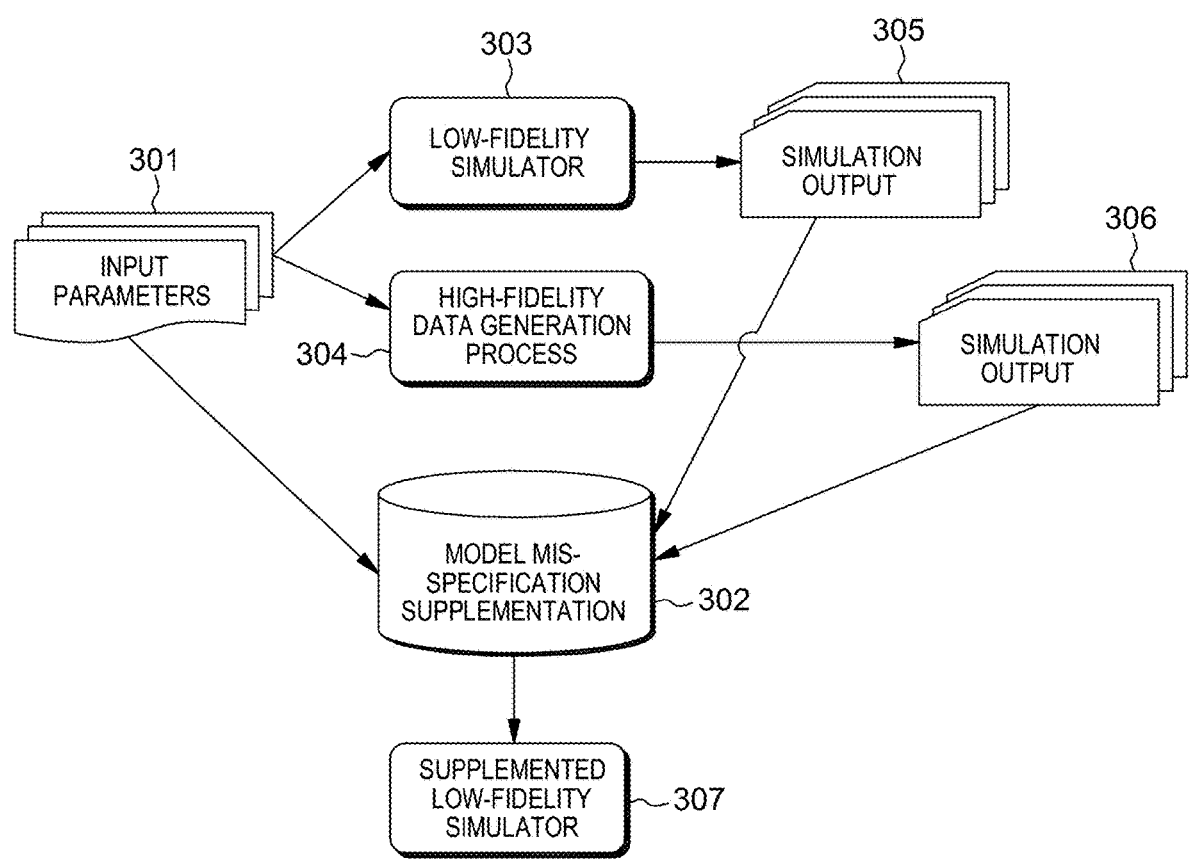
FIG. 3 illustrates an example schematic relating to the example computer system of FIG. 1.

FIG. 3 illustrates an example schematic relating to the example computer system of FIG. 1, arranged in accordance with at least some embodiments described herein. FIG. 3 is substantially similar to computer system 100 of FIG. 1 and FIG. 2, with additional details. Those components in FIG. 3 that are labeled identically to components of FIG. 1 and FIG. 2 will not be described again for the purposes of clarity.

An example schematic shown in FIG. 3 describes a multi-fidelity simulation problem and the role of system 100 in supplementing model mis-specification information. System 100 may improve reduced physics formulation with respect to a relatively more comprehensive formulation. For example, access to computationally intensive simulator in the form of input models and respective simulated data may be limited.

As shown in the schematic in FIG. 3, system 100 may receive input parameters 301, and may feed input parameters 301 into a low-fidelity simulator 303 and a high-fidelity data generation process 304. Low-fidelity simulator 303 may generate simulation output 305, and high-fidelity data generation process 304 may generate simulation output 306. A model mis-specification supplementation 302 may learn and/or update supplementation operators based on input parameters 301, simulation output 305, and simulation output 306. Supplementation operators learned by model mis-specification supplementation 302 may implemented by a supplemented low-fidelity simulator to generate outputs that may be of relatively high-fidelity than simulation output 305 and simulation output 306. As such, access to computationally intensive simulator in the form of input models and respective simulated data may be avoided.

Further, an objective to optimally supplement reduced physics models with necessary components may be achieved. In empirical feedback systems, an ability to derive an observation operator may be limited, but experimentation with various test models (phantoms) while recording corresponding data may be possible.

During numerical simulation processes, modeling errors may affect in the simulation output. Example ramifications may include inaccurate state descriptions, unstable model recoveries, and predictions that lead to erroneous control output or decisions. A system in accordance with the present disclosure may supplement the modeling operator by learning the missing components from authentic examples, while assuming some structure (implicit or explicit) of the supplement. For ill-posed problems a low rank supplement is proposed.

Physical simulation operators are typically constructed by first principles, yet, most simulation models involves model inadequacy error. A system in accordance with the present disclosure may describe a generic methodology for data-driven supplementation of simulation operators. By assuming some structure of the supplement, the missing part can be learned from authentic examples. As a consequence, simulation models of higher levels of fidelity, yet of modest computational requirements can be obtained.

A system in accordance with the present disclosure may provide data-driven supplementation of analytical simulation operators. In some examples, existing simulation code may be amended, or appended, with a learned supplemental operator. The supplemental operator may rely upon availability of example measured data, which may not be fully reconcilable by the existing simulation operators. A learning process to learn the supplemental operator may rely upon structural assumption exploitation of the supplemental operator (e.g. nuclear norm). The structural assumption may either be explicit (as in determining matrix entries structure), implicit (e.g. nuclear, atomic norms) or a combination of both. Further, access to the simulator code (blackbox), or to documentation that elucidate the current formulation details, is not required since the supplemental operator may be a supplement to the existing simulation operator. Instead of explicit derivation and implementation of more comprehensive simulation code (where often the corrective measure is not fully realized), existing simulation code may be amended with the supplemental operator. Traditionally, fidelity of simulation operators are corrected by first principles (i.e. implementation of more comprehensive simulation formulations). A system in accordance with the present disclosure may provide a relatively cost effective approach in terms of development time and computation, since current practices involve significant modification of core simulation code, which may be time consuming from a development perspective, and may significant slowdown the implementation due to increased computational complexity of the more comprehensive formulation. A system in accordance with the present disclosure may offer automatic prioritization based upon relevant attributes of the simulation that incur the largest source of errors, and quantitative extent to which simulation and simulation-derived output is deteriorated.

Typically, significant modifications of an existing simulation code may be time consuming from development perspective, and also often entails significant slowdown of the simulation code due to increased computational resources required for handing the more comprehensive formulation. Moreover, in many situations, one may neither have access to the simulator code, nor to sufficient documentation that elucidate the current formulation details. Furthermore, even when such formulation is known, one may often be agnostic to the relevant attributes of the simulation that exhibits the largest source of error and to what extent they deteriorate simulation and simulation-derived output. In some situations, a high-fidelity (potentially black-box) simulation model exists, yet, due to the excessive computational demands required for its computation, a low-fidelity simulation model is being used in practice. A system in accordance with the present disclosure may provide a generic, non-intrusive mechanism that will allow for effective modeling error mitigation. Such approach may be capable of handling black-box simulation settings, and function robustly over a broad range of inputs. The corrective measure such process yields may automatically address the most cardinal source of simulation error (in a predefined metric) and the incorporation of the supplementation should be least intrusive to the simulation process.

Figure 4:
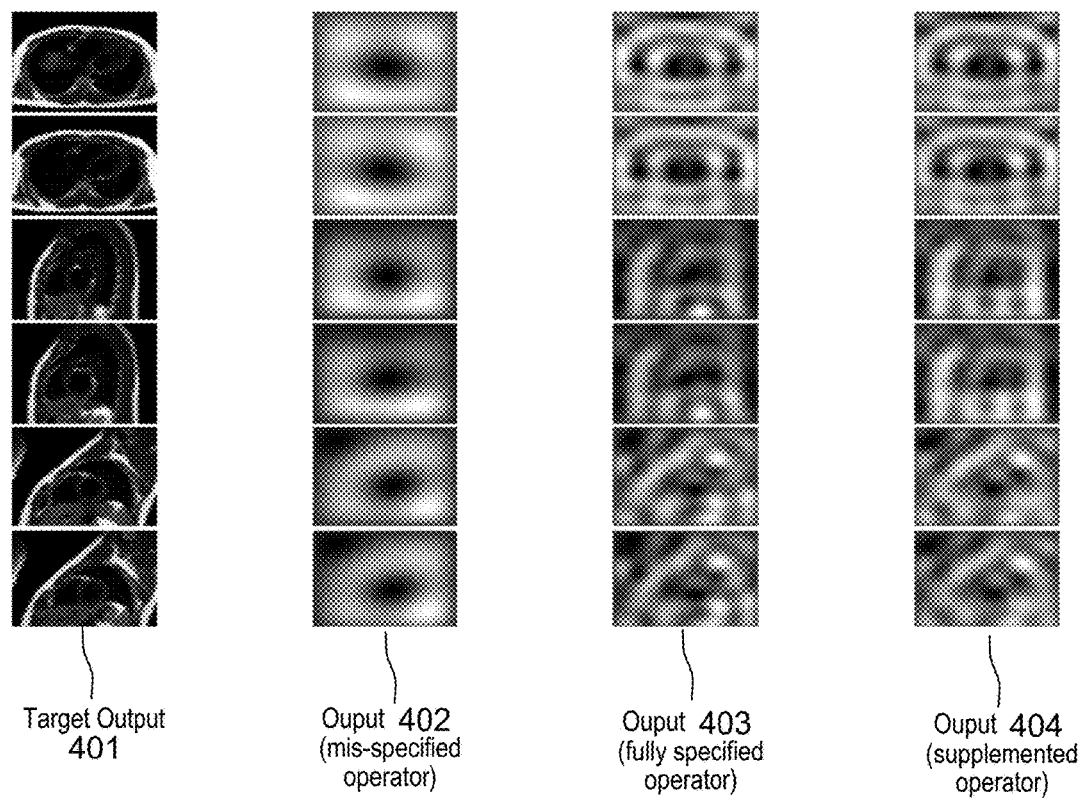
FIG. 4 illustrates example results of an implementation of the example computer system of FIG. 1.
Figure 4:
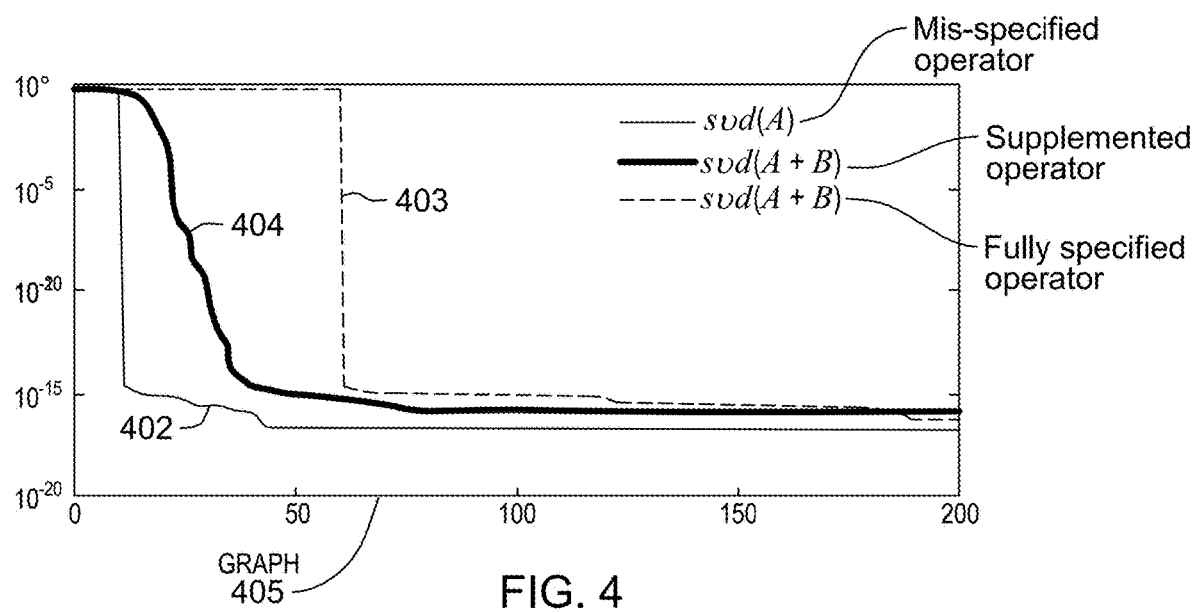

FIG. 4 illustrates example results of an implementation of the example computer system of FIG. 1, arranged in accordance with at least some embodiments presented herein. In the examples shown in FIG. 4, a target output 401 may be used as a standard model to determine an efficiency of system 100, such as a fidelity of the supplemented operator produced by system 100. In the examples, output 402 may be outputs generated by a simulation model using a mis-specified operator prior to an execution of system 100. Output 403 may be outputs generated, or simulated, by system 100 to reflect outputs that may be generated using a high-fidelity operator. Output 404 may be outputs generated by a supplemented operator generated by system 100. As shown in the examples, output 404 may be of a greater fidelity than output 402.

Further, as shown in a graph 405, distance measure between output 402 and output 403 may be significantly different at one or more points. However, output 404 generated using supplemented operator may result in outputs that are relative closer to output 403 than output 402.

Figure 5:
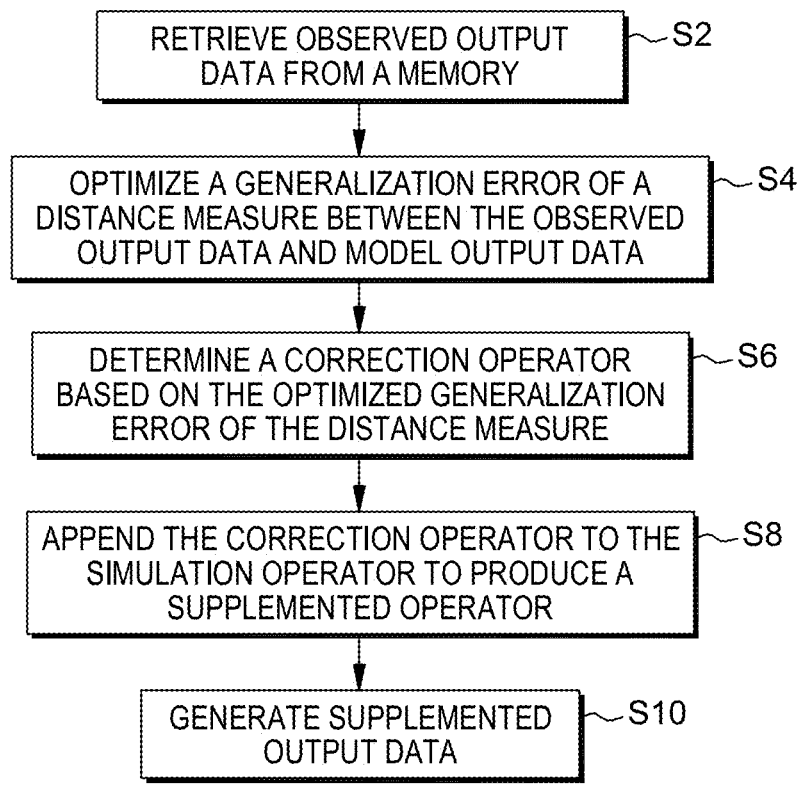
FIG. 5 illustrates a flow diagram for an example process to implement mis-specified model supplementation.

FIG. 5 illustrates a flow diagram for an example process to implement mis-specified model supplementation, arranged in accordance with at least some embodiments presented herein. The process in FIG. 5 could be implemented using, for example, computer system 100 discussed above. An example process may include one or more operations, actions, or functions as illustrated by one or more of blocks S2, S4, S6, S8, and/or S10. Although illustrated as discrete blocks, various blocks may be divided into additional blocks, combined into fewer blocks, or eliminated, depending on the desired implementation.

Processing may begin at block S2, "Retrieve observed output data from a memory". At block S2, a processor, or a supplementation module, may retrieve observed output data from a memory. The observed output data may be generated by a simulation module based on a simulation operator of a simulation model. The observed output data may be of a first fidelity.

Processing may continue from block S2 to block S4, "Optimize a generalization error of a distance measure between the observed output data and model output data". At block S4, the processor, or the supplementation module, may optimize a generalization error of a distance measure between the observed output data and model output data. The model output data may be generated by the simulation module based on a high-fidelity operator.

Processing may continue from block S4 to block S6, "Determine a correction operator based on the optimized generalization error of the distance measure". At block S6, the processor or the supplementation module, may determine a correction operator based on the optimized generalization error of the distance measure.

Processing may continue from block S6 to block S8, "Append the correction operator to the simulation operator to produce a supplemented operator". At block S8, the processor may append the correction operator to the simulation operator to produce a supplemented operator.

Processing may continue from block S8 to block S10, "Generate supplemented output data". At block S10, the simulation module may use the supplemented operator to generate supplemented output data. The supplemented output data may be of a second fidelity greater than the first fidelity.

Figure 6:
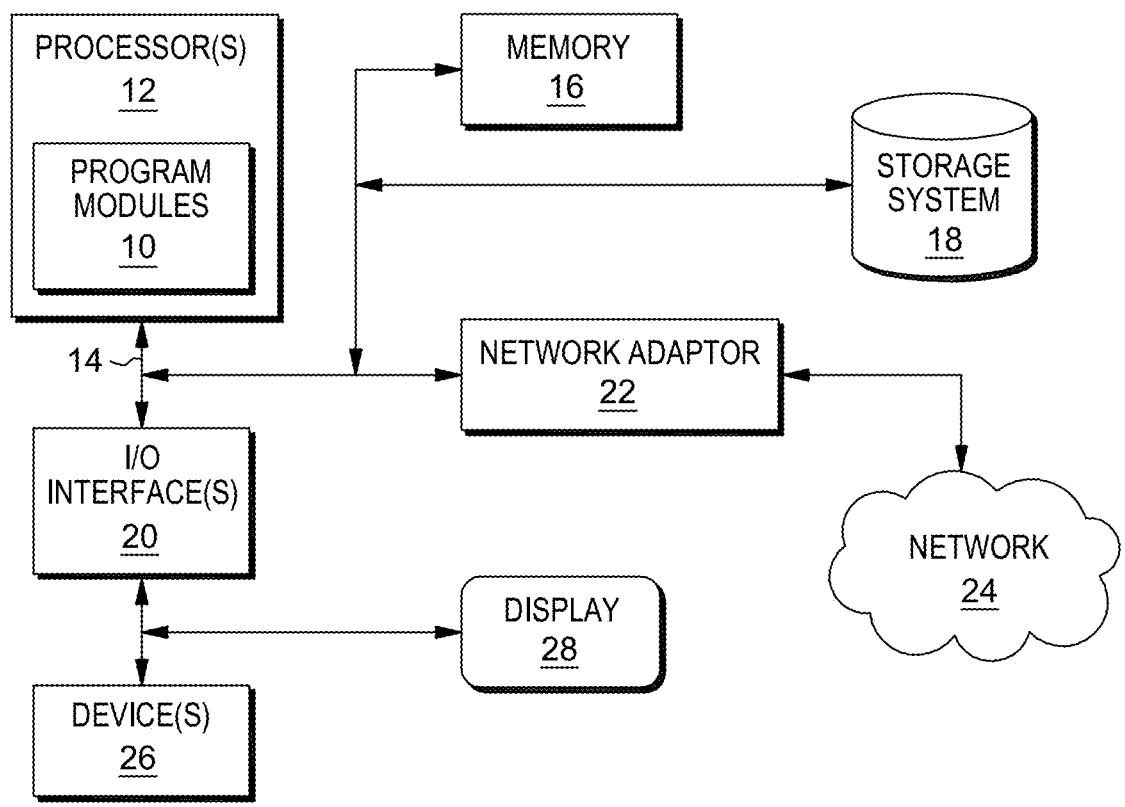
FIG. 6 is an exemplary block diagram of a computer system in which processes involved in the system, method, and computer program product described herein may be implemented.

FIG. 6 illustrates a schematic of an example computer or processing system that may implement any portion of computer system 100, processor 120, memory 122, supplementation module 130, simulation module 140, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computer system environments or configurations. Examples of well-known computer systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating output of a simulation model in a simulation system, the method comprising:
    retrieving, by a processor, observed output data from a memory, wherein the observed output data is generated based on a simulation operator of the simulation model;
    optimizing, by the processor, a generalization error of a distance measure between the observed output data and model output data, wherein the model output data is generated based on a high-fidelity operator;
    determining, by the processor, a correction operator based on the optimized generalization error of the distance measure;
    appending, by the processor, the correction operator to the simulation operator to produce a supplemented operator without modifying the simulation operator; and
    generating, by the processor, supplemented output data by applying the simulation model with the supplemented operator on a set of inputs.

2. The method of claim 1, wherein optimizing the generalization of the distance measure includes determining a set of solutions that minimizes the distance measure.

3. The method of claim 1, wherein optimizing the generalization of the distance measure is based on a constraint to bound a rank of the correction operator within a value.

4. The method of claim 1, wherein optimizing the generalization of the distance measure includes:
    allocating, by the processor, a portion of the memory for the correction operator;
    determining, by the processor, a set of gradients for each subset of the correction operator;
    determining, by the processor, a set of eigenvectors associated with each set of gradients; and
    populating, by the processor, the allocated portion of the memory with the determined set of eigenvectors.

5. The method of claim 4, wherein determining the set of eigenvectors includes determining a set of largest eigenvectors of each set of gradients.

6. The method of claim 1, wherein the distance measure is represented by a Frobenius norm function.

7. The method of claim 1, wherein the simulation operator is a non-linear operator.

8. The method of claim 1, wherein the observed output data is of a first fidelity, and the supplemented output data is of a second fidelity greater than the first fidelity.

9. A system effective to generate output of a simulation model in a simulation system, the system comprising:
    a memory configured to store a simulation model, wherein the simulation model includes a simulation operator;
    a simulation module configured to be in communication with the memory, the simulation module is configured to:
        generate observed output data based on the simulation operator;
        store the observed output data in the memory;
        generate model output data based on a high-fidelity operator;
        store the model output data in the memory;
    a supplementation module configured to be in communication with the memory, the supplementation module is configured to:
        retrieve the observed output data from the memory;
        optimize a generalization error of a distance measure between the observed output data and model output data; and
        determine a correction operator based on the optimized generalization error of the distance measure;
    a processor configured to be in communication with the simulation module and the supplementation module, the processor is configured to append the correction operator to the simulation operator to produce a supplemented operator without modifying the simulation operator; and
    the simulation module is further configured to generate supplemented output data by application of the simulation model with the supplemented operator on a set of inputs.

10. The system of claim 9, wherein the supplementation module is further configured to determine a set of solutions that minimizes the distance measure in order to optimize the generalization error of the distance measure.

11. The system of claim 9, wherein the supplementation module is further configured to bound a rank of the correction operator within a value in order to optimize the generalization error of the distance measure.

12. The system of claim 9, wherein the supplementation module is further configured to:
    allocate a portion of the memory for the correction operator;
    determine a set of gradients for each subset of the correction operator;

determine a set of eigenvectors associated with each set of gradients; and populate the allocated portion of the memory with the determined set of eigenvectors.

13. The system of claim 12, wherein determination of the set of eigenvectors includes a determination a set of largest eigenvectors of each set of gradients.

14. The system of claim 9, wherein the distance measure is represented by a Frobenius norm function.

15. The system of claim 9, wherein the observed output data is of a first fidelity, and the supplemented output data is of a second fidelity greater than the first fidelity.

16. A computer program product for generating output of a simulation model in a simulation system, the computer program product comprising a computer readable storage medium having program instructions embodied therewith, the program instructions executable by a processor of a device to cause the device to:

retrieve observed output data from a memory, wherein the observed output data is generated based on a simulation operator of a simulation model;

optimize a generalization error of a distance measure between the observed output data and model output data, wherein the model output data is generated based on a high-fidelity operator;

determine a correction operator based on the optimized generalization error of the distance measure;

append the correction operator to the simulation operator to produce a supplemented operator without modifying the simulation operator; and generate supplemented output data by applying the simulation model with the supplemented operator on a set of inputs.

17. The computer program product of claim 16, wherein the program instructions are further executable by the device to cause the device to:

determine a set of solutions that minimizes the distance measure; and bound a rank of the correction operator within a value in order to optimize the generalization error of the distance measure.

18. The computer program product of claim 16, wherein the program instructions are further executable by the device to cause the device to:

allocate a portion of the memory for the correction operator;

determine a set of gradients for each subset of the correction operator;

determine a set of eigenvectors associated with each set of gradients; and populate the allocated portion of the memory with the determined set of eigenvectors.

19. The computer program product of claim 16, wherein the determination of the set of eigenvectors includes a determination of a set of largest eigenvectors of each set of gradients.

20. The computer program product of claim 16, wherein the observed output data is of a first fidelity, and the supplemented output data is of a second fidelity greater than the first fidelity.

* * * * *